United States Patent
Walters et al.

(10) Patent No.: US 10,936,807 B1
(45) Date of Patent: Mar. 2, 2021

(54) SYSTEMS AND METHODS FOR DISPLAYING EFFECTS OF CODE CHANGES

(71) Applicant: Capital One Services, LLC, McLean, VA (US)

(72) Inventors: Austin Walters, Savoy, IL (US); Reza Farivar, Champaign, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/654,280

(22) Filed: Oct. 16, 2019

(51) Int. Cl.
| | |
|---|---|
| *G06F 40/194* | (2020.01) |
| *G06F 8/38* | (2018.01) |
| *G06F 9/451* | (2018.01) |
| *G06N 3/08* | (2006.01) |
| *G06N 3/04* | (2006.01) |
| *G06F 40/197* | (2020.01) |
| *G06F 3/0482* | (2013.01) |

(52) U.S. Cl.
CPC .............. *G06F 40/194* (2020.01); *G06F 8/38* (2013.01); *G06F 9/451* (2018.02); *G06F 40/197* (2020.01); *G06N 3/04* (2013.01); *G06N 3/08* (2013.01); *G06F 3/0482* (2013.01)

(58) Field of Classification Search
CPC ........ G06F 17/2211; G06F 9/451; G06F 8/38; G06F 17/2288; G06F 3/0482; G06N 3/04; G06N 3/08
USPC ......................................................... 715/229
See application file for complete search history.

(56) References Cited

U.S. PATENT DOCUMENTS

| | | | |
|---|---|---|---|
| 8,069,407 B1 | 11/2011 | Armandpour et al. | |
| 8,510,237 B2 * | 8/2013 | Cascaval | G06F 17/212 706/12 |
| 9,060,007 B2 * | 6/2015 | Keebler | G06F 16/27 |
| 9,817,804 B2 * | 11/2017 | Goldstein | G06F 40/194 |
| 2018/0018399 A1 * | 1/2018 | Hamm | G06F 16/957 |

(Continued)

OTHER PUBLICATIONS

O'Brien, Fred, "Artificial Intelligence and the Future of Web Design," WebsiteBuilderExpert, last updated Apr. 30, 2019. Available online at https://www.websitebuilderexpert.com/designing-websites/artificial-intelligence-and-the-future-of-web-design (16 pages).

*Primary Examiner* — Stephen S Hong
*Assistant Examiner* — Broderick C Anderson
(74) *Attorney, Agent, or Firm* — Bookoff McAndrews, PLLC

(57) ABSTRACT

Various embodiments of the present disclosure relate to identifying changed regions in user interfaces or other products of compiled code. Some embodiments of the present disclosure may include training a neural network to identify changed regions in a user interface by providing identified code changes to the neural network, receiving, from the neural network, a plurality of regions of a user interface predicted to be affected by the identified changes, and providing feedback to the neural network evaluating the plurality of predictions. Some embodiments of the present disclosure may include providing a trained neural network with an identified change in code for a user interface, receiving, from the trained neural network, an indicated region of the user interface predicted to be affected by the identified change, and outputting a visual representation of the indicated region of the user interface.

20 Claims, 4 Drawing Sheets

(56) References Cited

U.S. PATENT DOCUMENTS

2019/0079909 A1* 3/2019 Purandare ............ G06F 17/2288
2019/0386892 A1* 12/2019 Sundermeyer ....... G08B 25/008
2019/0392024 A1* 12/2019 Singh .................. G06F 17/2247

* cited by examiner

US 10,936,807 B1

SYSTEMS AND METHODS FOR DISPLAYING EFFECTS OF CODE CHANGES

TECHNICAL FIELD

Various embodiments of the present disclosure relate generally to systems and methods for visually indicating changes to code. Specifically, some embodiments of the present disclosure relate to systems and methods for using a trained neural network to predict effects of changes in code on a user interface, and outputting a visual indication of the prediction(s).

BACKGROUND

Verifying changes to user interfaces and other programs, caused by revisions in their code, presents multiple challenges. Changes to a user interface, for example, may be subtle, small, or unexpected. In some cases, a single revision to code may effect multiple changes throughout a user interface, not all of which may be immediately perceptible. The sheer size of large or complex user interfaces, e.g., containing many digital pages, windows, iterations, and/or variations, may present a challenge in verifying changes to them based simply on the time and effort that such verification may take. Additionally, verifying changes to user interfaces after a revision to code has been implemented may present further complications. Code revisions may have unintended results, ranging from minor visual errors to errors that render an interface non-functional.

The present disclosure is directed to addressing one or more of these challenges. The background description provided herein is for the purpose of generally presenting the context of the disclosure. Unless otherwise indicated herein, the materials and information described in this section are not prior art to the claims in this application and are not admitted to be prior art, or suggestions of prior art, by inclusion in this section.

SUMMARY

According to some aspects of the present disclosure, a method for identifying a changed region in a user interface may include receiving code for an updated version of the user interface, identifying a change between code for an earlier version of the user interface and the code for the updated version of the user interface, providing the identified change to a neural network, receiving, from the neural network, an indicated region of the user interface predicted to be affected by the identified change, identifying a region of the updated version of the user interface corresponding to the indicated region received from the neural network, and outputting a visual representation of the identified region of the updated version of the user interface.

According to some aspects of the present disclosure, a method for identifying a changed region in a user interface may include receiving code for an updated version of the user interface, identifying a change between code for an earlier version of the user interface and the code for the updated version of the user interface, providing the identified change to a neural network; receiving, from the neural network, an indicated region of the user interface predicted to be affected by the identified change, identifying a region of the updated version of the user interface that corresponds to the indicated region received from the neural network, outputting, to a device, a visual representation of the identified region of the updated version of the user interface, receiving, from the device, feedback evaluating an accuracy of the identified region, and providing the received feedback to the neural network.

According to some aspects of the present disclosure, a method for identifying a changed region in a user interface may include a training phase. The training phase may include providing a plurality of identified changes to code for the user interface to a neural network, receiving, from the neural network, a plurality of predictions of regions of the user interface predicted to be affected by the plurality of identified changes, and providing feedback to the neural network evaluating the plurality of predictions. The method may further include, after the training phase, providing the neural network with an identified change between code for a first version of the user interface and code for a second version of the user interface, receiving, from the neural network, an indicated region of the user interface predicted to be affected by the identified change, wherein the indicated region is based on the feedback provided to the neural network during the training phase, and outputting a visual representation of the indicated region of the user interface.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

Figure 1:
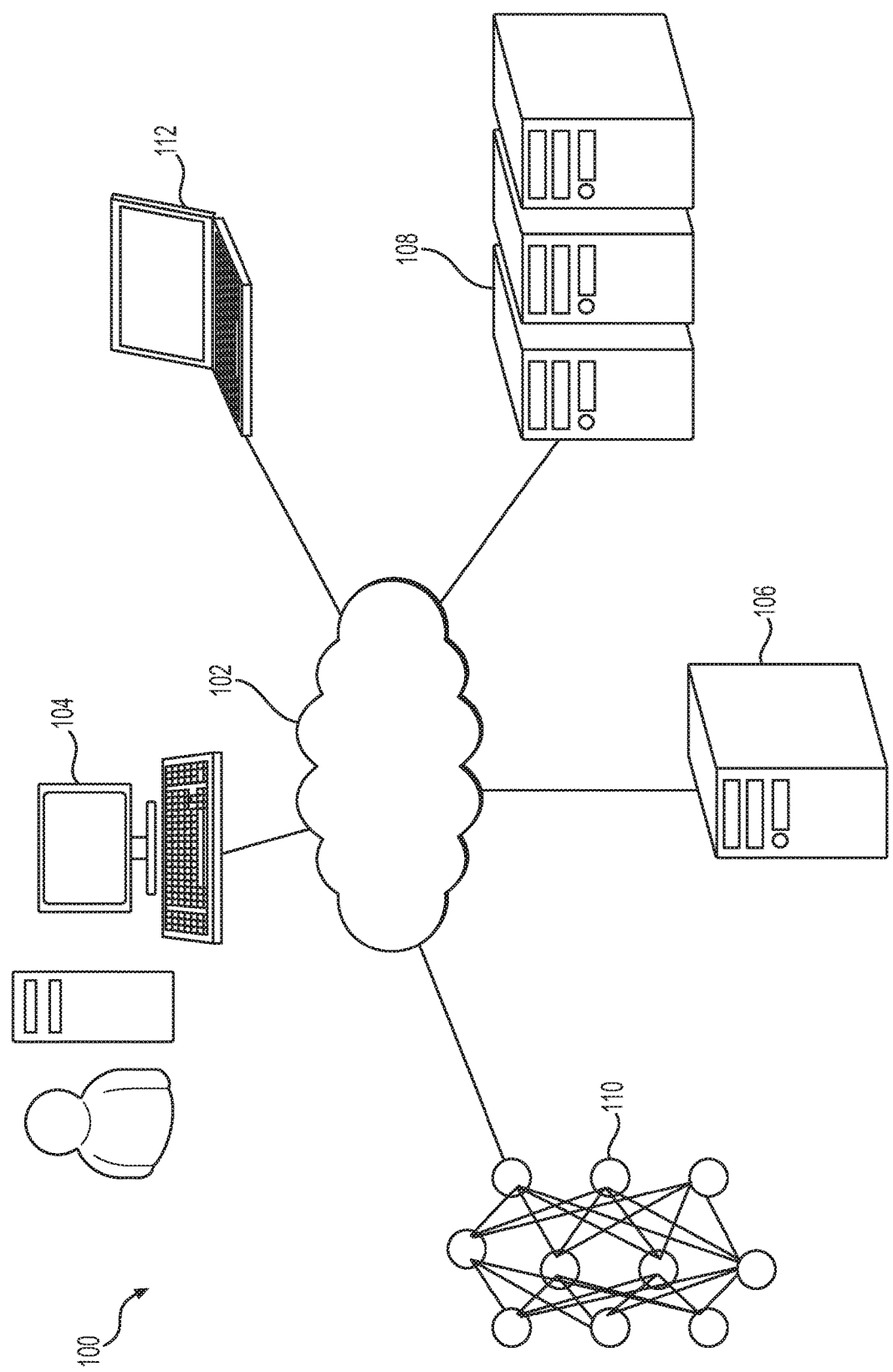
FIG. 1 illustrates, in schematic form, an exemplary system according to the present disclosure.

There are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION

The terminology used in this disclosure is to be interpreted in its broadest reasonable manner, even though it is being used in conjunction with a detailed description of certain specific examples. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "using" means "using at least in part." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value, unless stated otherwise.

The term "program" as used in the present disclosure refers to any product of compiled code. For example, a program may be a system program (e.g., required for use of a computer system), an application (e.g., a word processor, web browser, etc.), a website or web page, a utility program (e.g., a disk defragmentor, virus detection program, etc.) and/or a user interface for, or based on, any of the above. Programs according to the present disclosure may have some visible, audible, or otherwise perceivable output to, or effect on, a user at, e.g., a user device, such as a personal computer or portable device.

The term "user interface" as used in the present disclosure may refer to any aspect of a program displayed on a user device, such as a website or web page display, interactive display, or any other part of a program configured to be perceived and interacted with by a user via a user device. In some embodiments, a user interface may be configured to receive input from, and/or display output to, a user. For example, a user interface may have selectable components, fillable text boxes, menus, forms, links, etc. In some embodiments, a user interface may include multiple or changing visible outputs, such as a dynamic website or web page, and/or a plurality of web pages.

The term "code" as used in the present disclosure may refer to any computer language used to communicate instructions to a computing system, such as a single computer, a server or plurality of servers, or a cloud computing system. For example, code for a user interface may refer to a series of instructions for generating the user interface, in a computer language that may be read and compiled by a computer system, e.g., a server. The server may, in turn, generate the user interface for display on a user device (e.g., over a wired or wireless connection, such as the Internet). The code may be in any suitable language or format.

In some embodiments, code for a program, such as an application and/or a user interface, may be generated in multiple parts or stages (in some cases by a number of different sources, such as a number of different contributing coding users), and aggregated into a "master file," which may serve as the most recent, most complete code for the program. Updates to various parts of the code may be made intermittently and added to the master file, such that a single user need not manipulate the entirety of the code whenever updating a certain specific part or set of parts. In some such cases, the code in a master file may be lengthy and complex, and there may be a significant time/energy burden associated with compiling to re-generate or update the program. To reduce the overall number of times the code in the master file needs to be compiled, a compiler may simply compile the code and generate, re-generate, or update the program using the master file on a periodic basis, or based on a predetermined threshold, such as when an update of a certain size is added to the master file. For example, a compiler may compile code in the master file, e.g., once every week, once every month, once every other month, once every three months, once every six months, or upon instruction from an individual. Any other time period, schedule, or trigger for compiling the master file to generate/update the program may be suitable as well.

Aspects of the present disclosure are directed to training or tuning a machine learning model to assist in identifying parts of a program that have changed due to revisions made to the program's code. In whole or part, aspects of the present disclosure may rely on machine learning algorithms performed by neural networks. For example, aspects of the present disclosure may be directed to training a neural network to identify a portion or portions of a program that change due to alterations, additions, and/or subtractions in a master file of code, and then using the trained neural network to accurately identify a portion affected by a new change or changes to the master file. In some aspects of the present disclosure, a computer and/or computer system may work together with the neural network to perform aspects of the method. In some embodiments, for example, a computer or computer system may generate one or more visual representations of a portion identified by the neural network as being affected by a change to the code. In other embodiments, the neural network may generate one or more such visual representations itself. In some embodiments, the one or more visual representations may be transmitted to a user device for review. The visual representation(s) may include, e.g., a screenshot, partial screenshot, or zoomed-in cut of a portion of a user interface generated by the master file of code, before and/or after a change to the code has been made, such that a user would be able to identify and review the portion affected by the change to the master file accurately. Advantageously, the neural network's identification of the portion affected by the change to the master file, and the subsequent generation of a visual representation of the portion affected by the change, may greatly improve review of code changes by dramatically increasing the ease with which a user can review visible effects of such code changes.

Some aspects of the present disclosure may be particularly useful in embodiments where a master file is updated intermittently, either automatically or by one or more users, for some time before the master file "goes live" or is compiled into a new iteration of a program. For example, aspects of the present disclosure may be particularly suitable for reviewing changes caused by updates or revisions to a master file of code (known as "code commits") in advance of that file being compiled, so that any errors or unwanted changes to the program may be identified and fixed.

The foregoing description of advantages provided by systems and methods of the present disclosure is exemplary, and does not foreclose the existence of many other advantages that aspects of the present disclosure may provide. Reference will now be made to the figures accompanying the present disclosure. It is to be understood that the embodiments depicted in the figures are exemplary, and may provide one or more advantages or features described above.

FIG. 1 illustrates an exemplary system 100, which may encompass aspects of the embodiments disclosed herein, and/or in which steps of methods disclosed herein may be performed. System 100 may include a network 102, which may connect a contributor 104, a computer 106, server system 108, neural network 110, and end-user device 112.

System 100 may include computer hardware, computer software, and/or combinations of both, associated with each aspect of system 100. Moreover, system 100 may include more than one of any of the aspects of system 100 listed above. Aspects of system 100 may be located in similar or disparate locations. In some instances, for example, two or more of contributor 104, computer 106, server system 108, neural network 110, and end user device 112 may be located in a single geographic location (e.g., within a single campus or building). In some instances, two or more of contributor 104, computer 106, server system 108, neural network 110, and end-user device 112 may each be in separate physical locations (e.g., on separate computer systems, in separate databases, and/or in separate geographic locations). In some instances, for example, multiple contributors 104, multiple computers 106, multiple server systems 108, multiple neural networks 110, multiple end user devices 112, and/or multiple computers 106 may be located in separate geographical locations. In further instances, one or more of the aspects of system 100 may be located in the same physical location as another aspect of system 100, e.g., on the same computer, in the same database, or in the same geographic location. For example, neural network 110 may be housed on a computer 106 or server system 108.

Aspects and components of system 100 may be connected by wired or wireless connections. Some such connections are represented by the straight lines connecting some of the aspects of system 100 in FIG. 1; however, it is contemplated that additional or different wired or wireless connections may exist between aspects of system 100. Wired or wireless connections between aspects of system 100 may include, for example, connections within a single machine, or wired or wireless connections over a local area network or a wide area network (e.g., the Internet). Furthermore, while aspects of system 100 are shown in FIG. 1, it is contemplated that system 100 may include more components, fewer components, and/or alternate or additional configurations of the depicted components.

Network 102 may be any suitable wired or wireless network, or combination of wired or wireless networks. For example, in some embodiments, network 102 may include a local area network (LAN), wide area network (WAN), a public switch telephone network (PSTN), and/or the Internet. Generally, network 102 may serve to electronically connect two or more components of system 100, or two or more computers, electronic terminals, databases, servers, devices, user interfaces, or other electronic aspects of one or more components of system 100. Any part of system 100 may be connected directly to another (e.g., via a wired or wireless connection) over network 102, or may be connected indirectly via one or more intermediary servers, computers, LANs, WANs, routers, etc. to another part or parts of system 100. In some embodiments, network 102 may be simply a plurality of electronic connections between devices, servers, and the like.

Contributor 104 may be an individual or entity having or associated with a device or devices suitable for connecting to other components of system 100 via network 102. Generally, contributor 104 may be an individual person or entity contributing to, e.g., a program, either by providing code or a change/update to code to a master file (which may be stored on, e.g., computer 106 or server system 108), or by reviewing a potential effect of such change/update to code on a program (identified by, e.g., neural network 110), or both. For example, contributor 104 may be a programmer, graphic designer, web designer, beta tester, quality control specialist, or other type of contributor to a program. Additionally or alternatively, contributor 104 may be an individual or entity reviewing a predicted effect of a change/update to code on a program, identified by neural network 110, and providing feedback to neural network 110 as to accuracy, precision, or correctness of the predicted effect. For example, contributor 104 may be a programmer, web designer, quality control specialist, or a computer program itself, providing automated feedback to a neural network (e.g., neural network 110). While a single contributor 104 is depicted, it is contemplated that system 100 may include multiple contributors, all of which may have, or may be associated with, a device or devices suitable for connecting to other components of system 100. In some embodiments, for example, it is contemplated that a system 100 may include 10, 100, 1000, or more contributors 104.

In some embodiments, contributor 104 may use a local device (e.g., a personal computer) to draft, revise, or otherwise prepare an update to code for a portion of a program. Once contributor 104 has completed preparing such an update, contributor 104 may have the capability (e.g., sufficient permissions) to add the update to a master file for the program (stored on, e.g., computer 106 and/or server system 108). In some embodiments, contributor 104 may be able to instruct other aspects of system 100 (such as computer 106 or server system 108) to compile an updated master file and generate, re-generate, or update a live version of the program that incorporates the updates.

In some cases, contributor 104, either alone or together with other contributors 104, computer 106, and/or server system 108, further may have the ability to instruct, train, send data to, or receive data from, neural network 110. For example, as described below, neural network 110 may be able to review a change or update to a master file for a program, and may be configured to predict what aspects of a program, if any, are affected by the change or update. As described below, neural network 110 may be configured to identify any portion of the program affected by the change or update. Once a portion of the program is thus identified by neural network 110, contributor 104 may be able to review the identified portion to determine whether the change or update to a master file had any desired or undesired effect on the program. If any undesired effect is observed, contributor 104 may be able to further update code for the program (and the master file) to troubleshoot and/or reverse the undesired effect.

Also or alternatively, contributor 104 may be able to "train" neural network 110. Specifically, contributor 104 be able to review a portion of a program identified by neural network 110 as having been affected by a change or update to the code for the program, and provide feedback to neural network 110, indicating whether the identified portion is accurate (e.g., whether that portion was in fact affected by a change or update to the code for the program), and in some cases indicating a corrected, more accurate portion (e.g., a smaller, larger, or different portion of the program) that is affected. As discussed below, such feedback to neural network 110 may assist in training and improving neural network 110. Multiple contributors 104 providing feedback to neural network 110 may provide neural network 110 with sufficient volumes of data to improve its function. In some embodiments, as mentioned, contributors 104 providing feedback to neural network 110 may not be individuals, but rather may be computer programs themselves.

Computer 106 may be a computer or computer system configured to send, receive, and/or house data regarding code for a program. In some embodiments, for example, computer 106 may be configured to store a master file for a program, to which updates may be contributed by, e.g., one or more contributors 104. Computer 106 may further be configured to compile the master file and/or provide the master file to server system 108, such that a version of a program may be generated or updated. In some embodiments, computer 106 may be part of server system 108, and in other embodiments may be separate from server system 108.

In some embodiments, computer 106 may be configured to receive an update to a master file for a program from, e.g., a contributor 104, identify a change in code between the existing master file and the update, and provide the change to, e.g., neural network 110 and/or contributor 104 for analysis. Additionally or alternatively, computer 106 may be configured to receive identification of a portion of a program affected by a change in code from neural network 110, and provide such identification to contributor 104 or another entity for analysis. Accordingly, computer 106 may serve as an intermediary between one or more contributors 104 and neural network 110. In some embodiments, computer 106 may "assist" neural network 110 by, e.g., receiving identification of a portion of a program affected by a change in code from neural network 110, and generating a visual representation of the identification to provide to one or more contributors 104. For example, neural network 110 may identify, e.g., coordinates of an area on a particular window of a user interface in a program as being affected by a change in code. Computer 106 may use such coordinates to generate a representation (e.g., a screen shot, text description, etc.) of the identified area, and may provide the representation to, e.g., contributor 104.

In some embodiments, neural network 110 may be located (e.g., programmed) on computer 106. Computer 106 may include processors, memory, and the like to allow neural network 110 to operate according to methods of the present disclosure. While one computer 106 is depicted in system 100, it is contemplated that, in some aspects, multiple computers 106 may be a part of systems of the present disclosure and/or may help to execute methods of the present disclosure in concert.

Server system 108 may comprise one or more computers, and may be configured to house databases or other electronic storage systems. Further, server system 108 may be configured to store and/or execute one or more functions, algorithms, or manipulations of data housed within it or transferred to it. In some embodiments, server system 108 may receive and send data via, e.g., network 102, and may store, manipulate, or perform calculations using such data. Server system 108 may also be configured or authorized to access, send, retrieve, or manipulate data from other aspects of system 100, such as from contributor 104, computer 106, and/or neural network 110. For example, in some embodiments, server system 108 may be configured to store, compile, and/or generate a program created or updated by contributor 104. In some embodiments, a "live" version of the program may be stored on server system 108, for access by other components of system 100 (e.g., contributor 104, end-user device 112). In cases in which the program is a website, web page, or other web program, server system 108 may house the program such that other aspects of system 100 (e.g., contributor 104 and/or end-user device 112) may access and/or interact with the program. In some embodiments, server system 108 may house one or more neural networks (e.g., neural network 110) and may include processors, memory, and the like to allow neural network 110 to operate according to methods of the present disclosure. Additionally or alternatively, server system 108 may include computer 106. While one server system 108 is depicted in system 100, it is contemplated that, in some aspects, multiple server systems 108 may be a part of systems of the present disclosure and/or may help to execute methods of the present disclosure in concert.

Neural network 110 may include a group of functions and/or computer storage on one or more computers/computer systems (e.g., server system 108, computer 106, or other computer or system), configured to receive data from, e.g., computer 106, server system 108, contributor 104, and/or end-user device 112, make determinations using received data, and return such determinations to one or more components of system 100. For example, neural network 110 may be configured to receive updates and/or changes to code for a program from, e.g., contributor 104, computer 106, and/or server system 108, and identify one or more aspects of the program affected by the updates and/or changes to code. In some embodiments, for example, neural network 110 may be configured to receive identification of a change between code for an existing program, or an old version of code for a program, and an update to code for the program. In some embodiments, neural network 110 may be configured to simply receive notification that a change has been made to code for an existing program, and may be configured to then review code for the existing program and compare it to updated code to determine what change has been made.

In some embodiments, neural network 110 may be configured to return identification of a portion of a program (e.g., a visible portion of a user interface), if any, affected by an identified change to the code for the program. The returned identification may include, e.g., coordinates, an address (e.g., a file address, web page address, or the like), a combination of an address and coordinates, a screen shot, a full or cropped visual representation of a user interface, etc. In some embodiments, neural network 110 may be configured to return such identification to a computer (e.g., computer 106), which may translate the identification into a visual representation of a portion of a program. In other embodiments, neural network 110 may be configured to generate such a visual representation itself. The visual representation may include an image of a portion of the program, sized and configured to focus on an aspect of the program that has changed. For example, if neural network 110 identifies a header in a program as having been changed by an update to code for the program, then the visual representation may include an image of the header. If only a part of the header has changed, the visual representation may include only that part of the header. Generally, the visual representation may be sized and configured to draw attention to the portion of the program that has changed.

Neural network 110 may have the capability to "learn," or develop rules that improve its ability to perform its functions (e.g., determine portions of a program that have changed based on updates to code, and/or identify/generate visual representations of the portions of program that have changed). Neural network 110 may be trained by, e.g., feedback received from one or more contributors 104. In some embodiments, neural network 110 may undergo a training phase before performing its functions. In such a training phase, a large number of sample changes to code for a program may be provided to neural network 110, in response to which neural network 110 may return a number of predicted portions of the program affected by the sample changes. The predicted portions may be in the form of, e.g., coordinates, visual representations of the portions, etc. Feedback may be generated in response to the predicted portions. The feedback may be provided by, e.g., one or more contributors 104. The feedback may include whether each predicted portion of the program affected by the sample changes in code is accurate, inaccurate, requires adjustment, etc. The feedback may include, e.g., adjustments to the predictions provided by neural network 110. For example, if predictions are in the form of, e.g., coordinates or visual representations of a program, then feedback may include adjustments to such coordinates or visual representations, to improve the accuracy of the predictions. Neural network 110 may be trained using, e.g., tens, hundreds, thousands, tens of thousands, hundreds of thousands, or more sample changes to code for a program in this manner.

Neural network 110 may be, e.g., a recurring neural network (RNN), a convolutional neural network (CNN), a radial basis function neural network, a multilayer perception, a modular neural network, a sequence-to-sequence model, or other suitable model. In some embodiments, for example, neural network 110 may additionally or alternately include an algorithmic model not considered to be a "neural network" in the art. In some embodiments, neural network 110 may additionally or alternately include a learning method including, e.g., decision trees, such as a random forest, or other learning method.

End-user device 112 may include any device with which a user of a program may interact with the program, and which may send data to and/or receive data from other aspects of system 100 via network 102. Specifically, end-user device 112 may be configured to access a program stored on server system 108. In some embodiments, for example, end-user device 112 may include a computer having a screen, such as a personal computer, a smartphone, a tablet, or another such device. In some embodiments, end-user device 112 may include alternative methods of communication to a user (e.g., audio, tactile feedback, and the like). In some embodiments, end-user device 112 may be located remotely from (e.g., in a different geographic location from) other components of system 100, such as contributor 104, computer 106, server system 108, and/or neural network 110. End-user device 112 may not have access to, e.g., an uncompiled "master file" of code for a program, and may only have access to a "live" or deployed version of a program.

Aspects of system 100 may include computers or computer architecture. An exemplary description of a suitable computer/architecture is provided herein with respect to FIG. 4. Aspects of system 600, depicted in FIG. 4, may form parts or all of the computer architecture supporting, e.g., network 102, a device of contributor 104, computer 106, server system 108, neural network 110, and/or end-user device 112.

Figure 2:
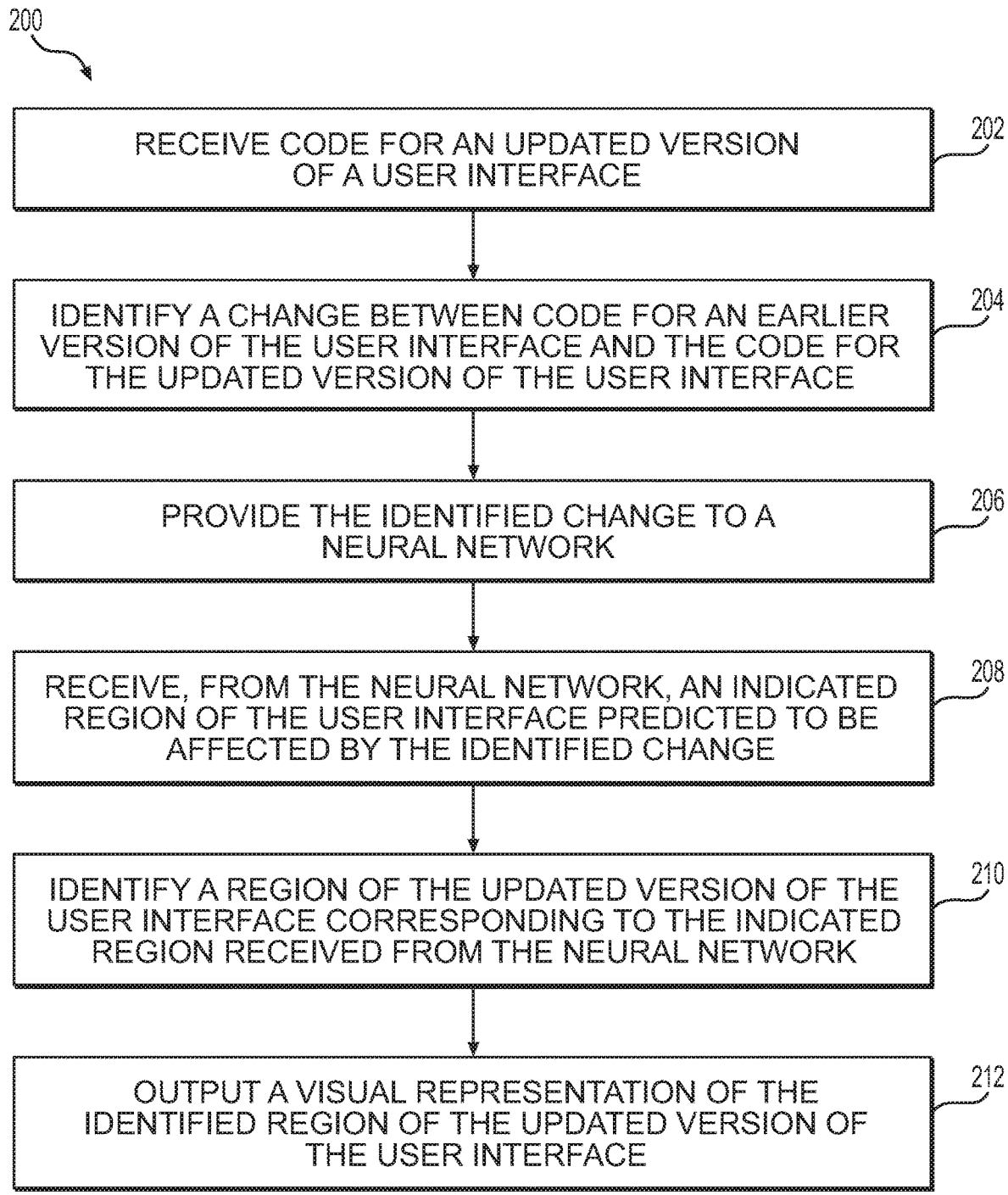
FIG. 2 depicts, in flow chart form, steps in a method for identifying a changed region of a user interface, according to aspects of the present disclosure.
Figure 3:
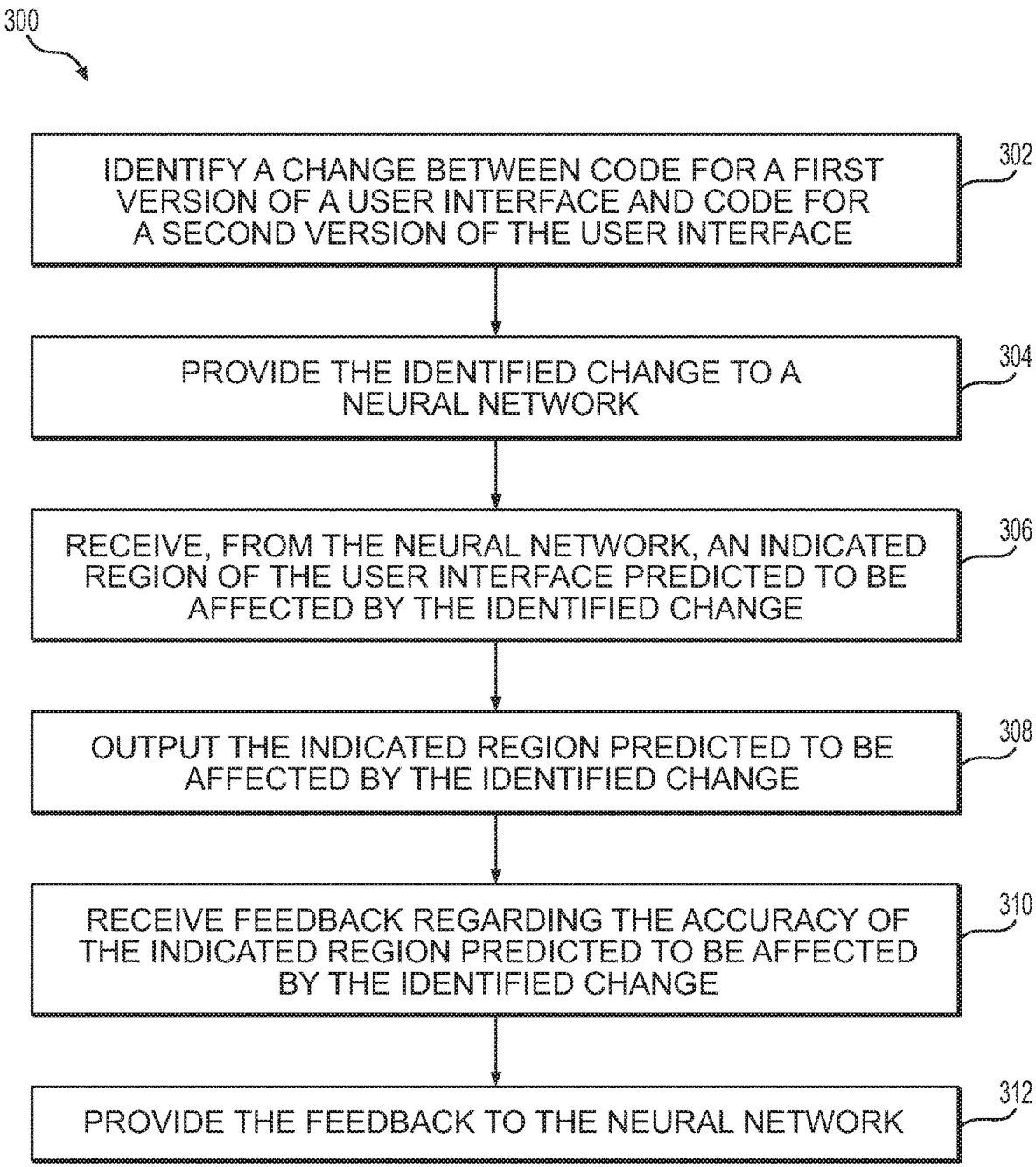
FIG. 3 depicts, in flow chart form, steps in a method for training a neural network, according to aspects of the present disclosure.

FIGS. 2 and 3 illustrate, in flow chart form, steps in exemplary methods according to aspects of the present disclosure. These methods may be performed within, e.g., system 100 (or other suitable systems). Aspects of system 100 are applicable to these methods, and as such those aspects will not be re-described in detail below. In some embodiments, the steps shown in each method may be performed consecutively as a part of a single method, or may be performed independently from one another. While FIGS. 2 and 3 each illustrate an exemplary method in relation to a user interface, the illustrated methods may be equally applicable to other programs or aspects of programs. Additionally, while FIGS. 2 and 3 each illustrate an exemplary order of steps, it is contemplated that steps may be added, removed, and/or performed in an order different from the illustrated order.

FIG. 2 depicts steps in an exemplary method 200 for identifying and displaying effects of changes in code on a user interface. According to step 202, code for an updated version of a user interface may be received. According to step 204, a change between code for an earlier version of the user interface and the code for the updated version of the user interface may be identified. According to step 206, the identified change may be provided to a neural network. According to step 208, an indicated region of the user interface predicted to be affected by the identified change may be received. According to step 210, a region of the updated version of the user interface corresponding to the indicated region received from the neural network may be identified. According to step 212, a visual representation of the identified region of the updated version of the user interface may be output.

As noted above, according to step 202, code for an updated version of a user interface may be received. The code may be partial code (e.g., it may include only updated portions of pre-existing code for the user interface), or it may include code for an entirety of a user interface. The user interface may be any type of user interface, as described elsewhere herein. In some embodiments, for example, the user interface may be a web page or website for display on a user device (e.g., end-user device 112). In some embodiments, the code may be provided by a contributor to the design/development/upkeep of the user interface (e.g., contributor 104). In some embodiments, the code may be received at a computer or computer system (e.g., computer 106) or at a server (e.g., server system 108). In some embodiments, the code may be received over a network (e.g., network 102) from a remote location. In other embodiments, the code may be received (e.g., at computer 106) from a geographically local location.

As noted above, according to step 204, a change between code for an earlier version of the user interface and the code for the updated version of the user interface may be identified. Code for an earlier version of the user interface may preexist (e.g., on computer 106 or server system 108). In some embodiments, a change between code for an earlier version of the user interface and the code for the updated version of the user interface may be identified by, e.g., a computer program on computer 106 or a computer program on server system 108. A computer program may, for example, compare the code for the earlier version of the user interface to the code for the updated version of the user interface to determine one or more typographical differences, differences in commands, differences in functions, etc. between the two codes. In some cases, a change may be identified by the provider of the code for the updated version (e.g., contributor 104). In further cases, a change may be identified by a neural network (e.g., neural network 110).

Further, as noted above, in step 206, the identified change may be provided to a neural network (e.g., neural network 110). As stated with respect to step 204, the neural network may itself identify the change, in which case the neural network may be provided with the code for the earlier version of the user interface and the code for the updated version of the user interface, in order to be able to identify the change. In further embodiments, the neural network may be provided with the identified change by, e.g., computer 106, server system 108, or contributor 104. In some embodiments, identifying the change may include, e.g., identifying a location of the change within a larger section of the code (or the entirety of the code), to provide context to the neural network. In some embodiments, identifying the change may additionally or alternately include, e.g., identifying the difference in code text attributable to the change.

Additionally, as noted above, in step 208, an indicated region of the user interface predicted to be affected by the identified change may be received. The neural network (e.g., neural network 110) may be trained to use the identified change to find a corresponding region of the user interface that would be affected by the identified change. Training may be accomplished by repeatedly providing feedback to the neural network in response to its predictions. An example of training the neural network is described with respect to FIG. 3. The indicated region may be received by, e.g., computer 106 or server system 108.

The region of the user interface predicted to be affected may be indicated in various ways. For example, a neural network may return, e.g., a location on a user interface identified by a set of coordinates, a web address, a file address, and/or a screenshot. The region may be identified with respect to, e.g., the earlier version of the user interface. In some cases, the region may be identified with respect to the updated user interface, if a compiled version of the updated user interface is available. In some cases, the region may be identified with respect to both the earlier version of the user interface and the updated version of the user interface.

In some embodiments, step 208 may result in receiving an indication that no region of the user interface is predicted to be affected by the identified change, or an indication that any region predicted to be affected by the identified change is too small to be of note. These are determinations that a neural network may be trained to make, based on feedback during a training or tuning phase. For example, a neural network may be trained to indicate that changes in code corresponding to a visible alteration of less than a single pixel in height or width is too small to be of note.

As discussed above, according to step 210, a region of the updated version of the user interface corresponding to the indicated region received from the neural network may be identified. This may be performed by, e.g., computer 106 or server system 108. In some embodiments, this may also or alternatively be performed by the neural network (e.g., neural network 110). In embodiments in which the region has already been identified with respect to the updated user interface, this step might not be performed. Otherwise, computer 106, server system 108, or neural network 110 may compare the location, set of coordinates, web address, file address, and/or screenshot with a like location, set of coordinates, web address, file address, and/or screenshot of the updated version of the user interface to identify the corresponding region. In some embodiments, no region of the updated version of the user interface may correspond to the indicated region received from the neural network, or, as stated above, there may be no notably-sized region predicted to be affected by the indicated change. In such cases, this may be shown by, e.g., outputting a message, alert, or other data indicating that a corresponding region was not found, or that no region has been indicated as being affected.

According to step 212, a visual representation of the identified region of the updated version of the user interface may be output. A visual representation may include, e.g., a screenshot, a partly compiled portion of the user interface, a textual description of the identified region, or any other visual representation that would aid a user in observing changes in the identified region between the earlier version of the user interface and the updated version of the user interface. In some embodiments, the visual representation may be output along with a like visual representation of the corresponding region in the earlier version of the user interface. Either one or both visual representations may be output to a device for review by a user (e.g., a device of a contributor 104). In cases where there is no identified region of the updated version of the user interface, the output may include a textual or visual indicator that no identified region was found.

In some cases, step 212 may include analyzing the identified region of the updated version of the user interface to determine whether a visual representation is warranted. In some cases, a change to code may not result in a difference that is deemed useful to be shown visually (e.g., a single-pixel migration of a graphic in a user interface may not be useful to show visually). This determination may be made by, e.g., the neural network (e.g., neural network 110), or may be made separately by a computer (e.g., computer 106). In any such cases, step 212 may include omitting an output of a visual representation of the updated version of the user interface and/or the earlier version of the user interface. Additionally or alternately, step 212 may include replacing a visual representation with a message indicating that no change significant enough to show in a visual representation was found.

In some embodiments, some steps of method 200 (e.g., steps 204-210) may be run multiple times for multiple identified changes between code for the earlier version of the user interface and the updated version of the user interface. In such embodiments, visual representations of all identified regions may optionally be output according to step 212 in, e.g., a log, a file, or other batch-type presentation for ease of review.

FIG. 3 depicts steps in an exemplary method 300 for training and/or tuning a neural network, according to aspects of the present disclosure. According to step 302, a change between code for a first version of a user interface and a second version of a user interface may be identified. According to step 304, the identified change may be provided to a neural network. According to step 306, an indicated region of the user interface predicted to be affected by the identified change may be received from the neural network. According to step 308, the indicated region predicted to be affected by the identified change may be output. According to step 310, feedback regarding the accuracy of the indicated region predicted to be affected by the identified change may be received. According to step 312, the feedback may be provided to the neural network.

As noted above, according to step 302, a change between code for a first version of a user interface and a second version of a user interface may be identified. This step may be analogous to step 204 of method 200. As with step 204, this step may be performed by, e.g., a computer program (e.g., on computer 106 or server system 108), or by a neural network (e.g., neural network 110). According to step 304, the identified change may be provided to a neural network. This step may be analogous to step 206 of method 200. In some embodiments, for example, the change may itself be identified by the neural network (e.g., neural network 110).

According to step 306, an indicated region of the user interface predicted to be affected by the identified change may be received from the neural network. This step may be analogous to step 208, in terms of the manner in which a region is indicated. In cases in which a neural network is untrained, the neural network may return an indicated region at random, or may indicate an extremely broad region of the user interface relative to a region that would in actuality be affected by the change (e.g., an entirety of the user interface, a half of the user interface, or an entire visible portion of the user interface when the change in code would only affect a small part of the visible portion).

According to step 308, the indicated region predicted to be affected by the identified change may be output, to, e.g., an individual or entity that may evaluate the prediction. For example, a computer (e.g., computer 106) may output the indicated region to a contributor or multiple contributors (e.g., contributor 104), where each contributor may be an individual or a computer entity that may evaluate an accuracy, precision, and/or correctness of the prediction. The indicated region predicted to be affected may be output in any suitable manner, such as any manner described with respect to output step 212 of method 200. In some cases, for example, the indicated region predicted to be affected may be output as a side-by-side comparison of the indicated region in the first version of the user interface and the indicated region in the second version of the user interface. The indicated region may be output in the form of, e.g., a screenshot, an image, a set of coordinates, a web address, a file address, or any combination thereof, or any other useful method of presenting the indicated region for evaluation.

According to step 310, as discussed above, feedback regarding the accuracy of the indicated region predicted to be affected by the identified change may be received. For example, a computer (e.g., computer 106) may receive the feedback. The feedback may be in the form of a verification as to whether the indicated region was correct at all (e.g., a binary correct/incorrect indicator), verification or a grade as to the precision of the indicated region (e.g., whether the region predicted to be affected is too large or too small compared to the region actually affected by the change), and/or verification or a grade as to precision of the indicated region (e.g., whether the region predicted to be affected is centered or focused on the actual region predicted to be affected). In some cases, the feedback may be in the form of an alteration to the indicated region. For example, if a screenshot or set of coordinates indicating a region was provided, then feedback may include an altered larger, smaller, or different screenshot or set of coordinates. In some cases, feedback may include an indication that no region was affected, or that no region notable enough to show (e.g., no large enough region) was affected.

According to step 312, if the feedback has not yet been received by the neural network (e.g., as a part of step 310), the feedback may be provided to the neural network by, e.g., computer 106.

The steps of method 300 may be performed recursively and/or multiple times in tandem in order to train a neural network (e.g., neural network 110). For example, the steps of method 300 may be performed tens, hundreds, thousands, tens of thousands, hundreds of thousands, or more times, in order for a neural network to learn increasingly precise correlations between changes in code and affected regions of a user interface (or other program). Methods for training or tuning a neural network according to the present disclosure may include, for example, reinforcement learning.

As stated previously, methods 200 and 300 may be combined to form a single method comprising a training/tuning phase (method 300) and a post-training/tuning phase (method 200). Moreover, methods 200 and 300 may be combined and performed recursively, in tandem, or repeatedly in sequence, such that a neural network may be consistently tuned while also identifying effects of changes in code on user interfaces (or other programs) for use in, e.g., code review processes. In some embodiments, following step 212 of method 200, feedback regarding the accuracy of the visual representation output according to step 212 may be provided to the neural network (e.g., similar to steps 310 and 312). The neural network may use such feedback to further train itself. In some embodiments, method 300 may be performed as a training phase, and methods 200 and 300 may both be performed in combination, in tandem, or in sequence thereafter to continue tuning a neural network as it works.

In general, any process or method discussed in this disclosure that is understood to be performable by a computer may be performed by one or more processors. Such processors may be located in, for example, one or more of the components of system 100, depicted in FIG. 1. The one or more processors may be configured to perform steps of the methods disclosed herein by instructions (computer-readable code) that, when executed by the processors, cause the one or more processors to perform the processes. The instructions also may be stored on a non-transitory computer-readable medium.

Figure 4:
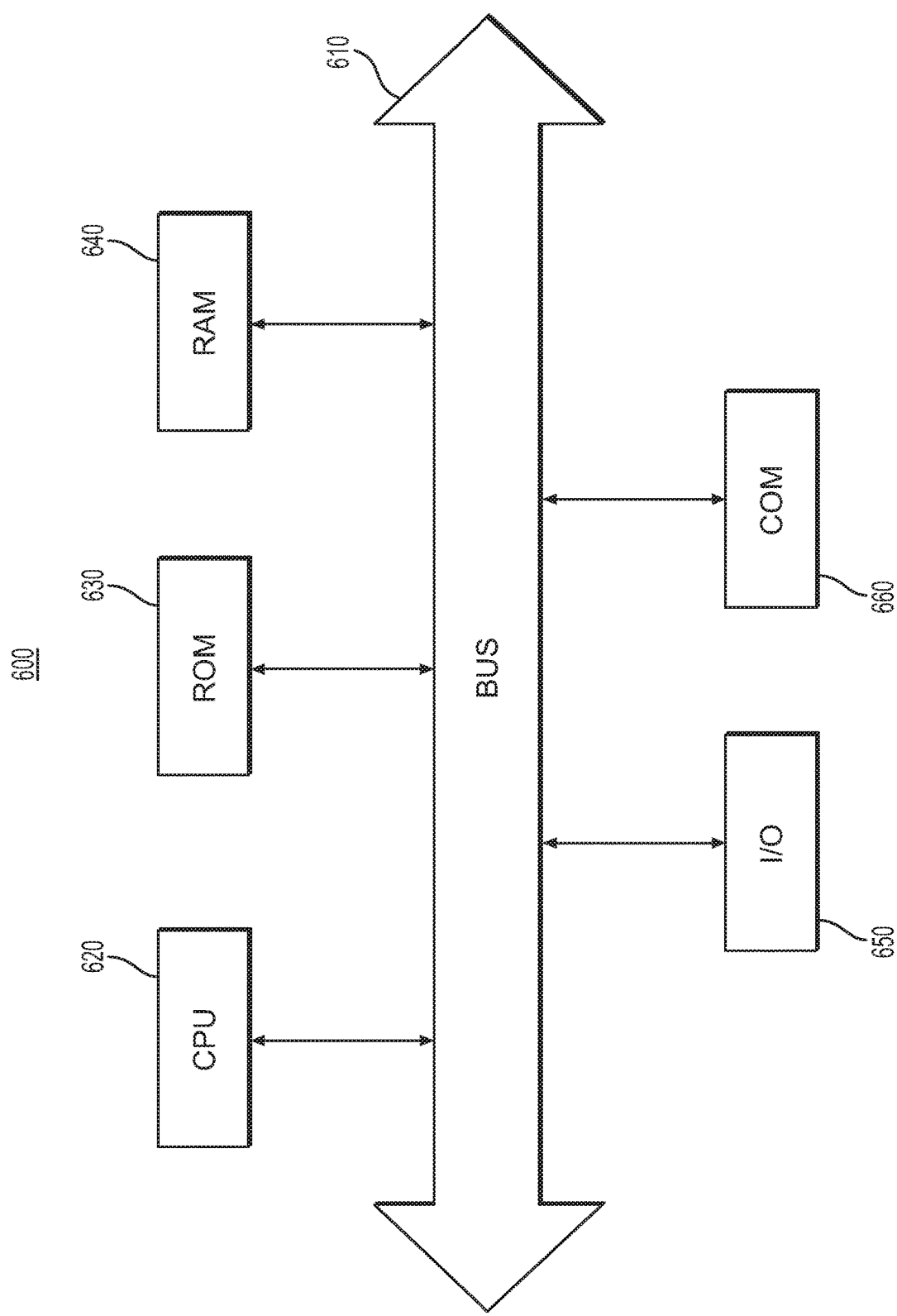
FIG. 4 is a block diagram depicting an exemplary computing device that may execute techniques presented herein.

FIG. 4 is a simplified functional block diagram of a computer system 600 that may be configured to execute techniques described herein, according to exemplary embodiments of the present disclosure. Specifically, the computer system 600 (or "platform" as it may not a be a single physical computer infrastructure) may include a data communication interface 660 for packet data communication. The computer system 600 or platform also may include a central processing unit ("CPU") 620, in the form of one or more processors, for executing program instructions. The computer system 600 or platform may include an internal communication bus 610, and also may include a program storage and/or a data storage for various data files to be processed and/or communicated by the computer system 600 or platform such as ROM 630 and RAM 640, although the computer system 600 may receive programming and data via network communications. The computer system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In the above description, various aspects of the disclosed systems and methods are sometimes grouped together in a single embodiment, figure, or description thereof for the purpose of streamlining the disclosure and aiding in the understanding of one or more of the various inventive aspects. This is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, combinations of features of different embodiments disclosed herein are intended to be within the scope of the present disclosure, as would be understood by those skilled in the art. Thus, while certain embodiments have been described, those skilled in the art will recognize that other and further modifications may be made thereto without departing from the spirit of the invention. For example, functionality may be added or deleted from the block diagrams and flow charts provided herewith. Moreover, steps of the methods disclosed herein may be added, deleted, or performed out of their depicted order.

The above disclosed subject matter is to be considered illustrative, and not restrictive, and the appended claims are intended to cover all modifications, enhancements, and implementations that fall within the true spirit and scope of the present disclosure. Thus, to the maximum extent allowed by law, the scope of the claims is to be determined by their broadest permissible interpretation. While various implementations of the disclosure have been described, it will be apparent to those of ordinary skill in the art that many more implementations are possible within the scope of the disclosure.

What is claimed is:

1. A method for identifying a changed region in a user interface, the method comprising:
    receiving code for an updated version of the user interface;
    identifying a change between code for an earlier version of the user interface and the code for the updated version of the user interface;
    providing the identified change to a neural network;
    receiving, from the neural network, an indicated region of the user interface predicted to be affected by the identified change;
    identifying a visual region of the updated version of the user interface corresponding to the indicated region received from the neural network; and
    outputting a visual representation of the identified region of the updated version of the user interface.

2. The method of claim 1, wherein the user interface is a website, and wherein the indicated region of the user interface predicted to be affected by the identified change is a portion of a web page on the website.

3. The method of claim 2, wherein the step of identifying the change between code for the earlier version of the user interface and the code for the updated version of the user interface is performed before the updated version of the user interface is made available on the Internet.

4. The method of claim 1, wherein the step of outputting the visual representation of the identified region of the updated version of the user interface comprises:
    outputting an image of the identified region to a user display, wherein the image of the identified region includes less than a full web page.

5. The method of claim 1, wherein the step of outputting a visual representation of the identified region of the updated version of the user interface comprises:

outputting (a) an image of the identified region of the updated version of the user interface and (b) an image of a corresponding region of the earlier version of the user interface, wherein (a) and (b) are displayed simultaneously on a user device.

6. The method of claim 1, wherein the step of receiving, from the neural network, the indicated region of the user interface predicted to be affected by the identified change comprises receiving multiple indicated regions of the user interface, and wherein identifying the visual region of the updated version of the user interface corresponding to the indicated region received from the neural network comprises identifying multiple regions of the updated version of the user interface.

7. The method of claim 6, wherein the step of outputting the visual representation of the identified region of the updated version of the user interface comprises:

outputting, to a display, an interactive list of each identified region of the updated version of the user interface, wherein the interactive list provides access to an image of each identified region of the updated version of the user interface.

8. The method of claim 1, further comprising tuning the neural network, wherein tuning the neural network comprises:

revising the visual region of the updated version of the user interface corresponding to the indicated region received from the neural network; and providing, to the neural network, the revised visual region.

9. The method of claim 8, wherein the visual region of the updated version of the user interface corresponding to the indicated region received from the neural network is defined by a position on the user interface and an area, and wherein the step of revising the visual region comprises changing one of the position or the area.

10. The method of claim 1, further comprising:

before receiving code for the updated version of the user interface, providing to the neural network a plurality of identified changes in code for user interfaces and a plurality of regions of the user interfaces affected by the identified changes in code.

11. A method for identifying a changed region in a user interface, the method comprising:

receiving code for an updated version of the user interface;

identifying a change between code for an earlier version of the user interface and the code for the updated version of the user interface;

providing the identified change to a neural network;

receiving, from the neural network, an indicated region of the user interface predicted to be affected by the identified change;

identifying a visual region of the updated version of the user interface that corresponds to the indicated region received from the neural network;

outputting, to a device, a visual representation of the identified region of the updated version of the user interface;

receiving, from the device, feedback evaluating an accuracy of the identified region; and providing the received feedback to the neural network.

12. The method of claim 11, wherein the user interface is a website configured for display on multiple platforms, and wherein the step of identifying the visual region of the updated version of the user interface that corresponds to the indicated region received from the neural network is performed for each of the multiple platforms.

13. The method of claim 12, wherein the multiple platforms include:

a web browser on a personal computer; and a web browser on a mobile personal device.

14. The method of claim 11, wherein each step of the method of claim 11 is a part of a first iteration of the method, the method further comprising a second iteration of the method, the second iteration following the first iteration.

15. The method of claim 11, wherein the user interface is a website, and wherein the code for the updated version of the user interface is received after the code is committed to a master file and before the updated version of the user interface is available on the Internet.

16. The method of claim 11, wherein the visual representation of the identified region of the updated version of the user interface is an image of a region of a web page.

17. The method of claim 11, wherein the feedback evaluating the accuracy of the identified region includes an update to the visual representation of the identified region of the updated version of the user interface.

18. The method of claim 11, wherein the feedback evaluating the accuracy of the identified region includes an indication that the visual representation of the identified region of the updated version of the user interface is correct.

19. The method of claim 11, wherein the user interface is configured for sending and receiving data over the Internet, and wherein the step of providing the received feedback to the neural network is performed before the updated version of the user interface is accessible over the Internet.

20. A method for identifying a changed region in a user interface, the method comprising:

in a training phase:

providing a plurality of identified changes to code for the user interface to a neural network;

receiving, from the neural network, a plurality of predictions of visual regions of the user interface predicted to be affected by the plurality of identified changes; and providing feedback to the neural network evaluating the plurality of predictions; and after the training phase:

providing the neural network with an identified change between code for a first version of the user interface and code for a second version of the user interface;

receiving, from the neural network, an indicated region of the user interface predicted to be affected by the identified change, wherein the indicated region is based on the feedback provided to the neural network during the training phase; and outputting a visual representation of the indicated region of the user interface.

* * * * *